United States Patent
Nishitani et al.

[11] Patent Number: 5,966,553
[45] Date of Patent: Oct. 12, 1999

[54] STILL CAMERA

[75] Inventors: Yasuhiro Nishitani; Takaaki Kotani, both of Saitama, Japan

[73] Assignee: Fuji Photo Film Co., Ltd., Kanagawa, Japan

[21] Appl. No.: 08/997,875

[22] Filed: Dec. 24, 1997

[30] Foreign Application Priority Data

Dec. 26, 1996 [JP] Japan .................................. 8-346851
Feb. 27, 1997 [JP] Japan .................................. 9-043859
Feb. 27, 1997 [JP] Japan .................................. 9-043860

[51] Int. Cl.$^6$ .................................................. G03B 17/24
[52] U.S. Cl. ........................ 396/303; 396/311; 396/429; 396/436; 348/64
[58] Field of Search ..................... 396/429, 374, 396/385, 386, 310, 311, 319, 321, 207, 210, 303; 348/64

[56] References Cited

U.S. PATENT DOCUMENTS

| | | | |
|---|---|---|---|
| 4,738,526 | 4/1988 | Larish | 396/429 |
| 4,814,811 | 3/1989 | Saito et al. | 354/412 |
| 4,841,359 | 6/1989 | Hawkins et al. | 348/64 |
| 5,099,265 | 3/1992 | Lee | 396/374 |
| 5,179,478 | 1/1993 | Aoki | 360/35.1 |
| 5,710,954 | 1/1998 | Inoue | 396/374 |

FOREIGN PATENT DOCUMENTS

| | | | |
|---|---|---|---|
| 0 665 672 | 8/1995 | European Pat. Off. | H04N 1/21 |
| 43 40 682 | 1/1995 | Germany | H04N 5/76 |
| 4-8993 | 2/1992 | Japan | H04N 5/782 |
| 4-184484 | 7/1992 | Japan | G09G 3/36 |

Primary Examiner—David M. Gray
Attorney, Agent, or Firm—Sughrue, Mion, Zinn, Macpeak & Seas, PLLC

[57] ABSTRACT

A still camera is provided with an area image sensor for obtaining digital image data, an LCD viewfinder, components for photographing image frames on a photo filmstrip in response to a shutter release operation, and a memory for storing the image data. The image data of one frame is written in the memory synchronously with each shutter release operation. In association with the image data of one frame, an ID code of the filmstrip and a frame number of the photographed image frame corresponding to the image data are written in the memory. Based on the data written in the memory, the display device can display a still image of the image frame photographed on the filmstrip, accompanied with the frame number of the photographed image frame. The still camera may be connected to a personal computer to transfer the data written in the memory to a memory of the personal computer, for displaying a still image of the photographed image frame along with the ID code and the frame number on an external monitor, or for making a hard copy of the photographed image frame.

18 Claims, 12 Drawing Sheets

STILL CAMERA

BACKGROUND OF THE INVENTION

1. Field of the Invention

The present invention relates to a portable still camera, and more particularly to a still camera which can photograph high-definition image frames on a silver-salt filmstrip and simultaneously pick up digital image data of each frame through an image sensor.

2. Background Arts

A wide variety of digital still cameras or electronic still cameras have been developed and brought in the market, as IC memories have a higher capacity and getting more compact. The digital still camera picks up a photoelectric image signal from a still image through a solid state imaging device, such as a CCD image sensor, and converts the image signal into digital image data to write it in a memory. The image data written in the memory can be processed in many ways instantly. For example, it is possible to transfer the image data to a peripheral apparatus for image processing like a personal computer, or to a video printer for making a hard copy.

On the other hand, still cameras that photograph still images on silver-salt photo film are well known. In these film-photo cameras, images are photochemically fixed on the photo film that has a higher resolving power even in comparison with the state-of-the-art imaging device with large scale highly integrated pixels. In view of the density gradation and the dynamic range, the silver-salt photo film is superior to the imaging device, so that a high quality still image is obtained by use of the photo film without the need for an expensive camera.

In order to obtain as high of quality image for the digital still camera as available by the film-photo camera, the digital still camera must have a large scale highly integrated imaging device, and a large capacity memory for storing enormous amount of image data that is obtained through the imaging device, i.e. at least 1 megabyte per frame, and 40 megabytes for a 40-exposure filmstrip. As a result, the scale and the cost of the digital still camera are both raised. It may be possible to compress the image data before storing, in order to save the memory capacity. However, once the image data is compressed, it is hard to reproduce the high quality image data from the compressed data even through an advanced image processing.

On the contrary, the film-photo camera can photograph high quality still images at a low cost, but the image on the photo film cannot be directly processed. For the image processing, it is necessary to convert the photographic image into electric image data through an electric viewer or a scanner.

Since a wide spread photo filmstrip can take 12 to 40 frames, an enormous memory capacity is necessary to store image data as an image file in order to maintain the high quality of the image, even while the image data is obtained from a single filmstrip through the scanner or the like. A hard disc or an optical disc, which is incorporated into a personal computer, does not have such an enormous capacity. Although it is possible to store image data of a limited number of designated frames in the memory of the personal computer, all frames on a filmstrip should be scanned to convert them into image data so as to permit designating desired frames. This is inefficient and time consuming. JPB 4-8993 discloses a digital still camera which writes data relating to each image frame, such as the date and the location of photography, along with image data of that frame into a recording medium. But this prior art does not disclose storing image data in association with photographic frames and photo filmstrips.

Meanwhile, a new type of film cartridge, called IX240 type, has been developed and marketed. The IX240 type film cartridge contains a roll of filmstrip whose entire back surface is coated with a transparent magnetic recording layer, so data relating to each frame may be recorded as a binary code on the magnetic recording layer after the exposure. The photo data written on the magnetic recording layer may include a shutter speed and a stop aperture size that are used for taking that frame, the date of photography, and so forth.

It is also known in the art to magnetically or optically record print option data on the filmstrip in association with each frame. The print option data include print format data that assigns a different print format, e.g. a panoramic size print, to one of the image frames that are recorded in the same size on the filmstrip. The print option data may also include the number of prints to be made from an image frame. Conventionally, the print option data is set up prior to exposure, and is recorded after each exposure. Practically, however, it is more useful to determine the print format and the number of prints while observing the photographed image frames after being developed. In addition, the photographer might miss the opportunity of a particular image while setting up the print option data prior to exposure pressing the shutter. Therefore, it is desirable that the camera allows setting up or revising print option data after the film has been exposed while observing the photographed image.

SUMMARY OF THE INVENTION

In view of the foregoing, a prime object of the present invention is to provide a still camera that can photograph high quality images on photo film and, at the same time, permits processing image data of the photographic images with ease in a peripheral apparatus that does not have a large capacity memory for an image data file, without damaging quality of the image.

Another object of the present invention is to provide a still camera that can photograph images on a photo filmstrip and record data relating to each individual photographed image frame on a recording medium in association with image data of the individual image frame, and that permits assigning print option data to the image frame or revising it after the exposure or the development.

To achieve the above and other object, a still camera of the present invention is provided with an imaging device and an image processing device for obtaining digital image data, a display device as a viewfinder that displays a movie image of a subject based on the digital image data, components for photographing image frames on a photo filmstrip in response to a shutter release operation, and a memory for storing the image data. The image data of one frame is written in the memory synchronously with each shutter release operation. In association with the image data of one frame, an ID code of the filmstrip and a frame number of the photographed image frame corresponding to the image data are written in the memory. Based on the data written in the memory, the display device can display a still image of the image frame photographed on the filmstrip, accompanied with the frame number of the image frame.

The still camera may be connected to a personal computer to transfer the data written in the memory to a memory of the personal computer, for displaying a still image of the photographed image frame along with the ID code and the frame number on an external monitor, or for making a hard copy of the photographed image frame.

According to a preferred embodiment, the still camera is further provided with manual data input members for entering optional data to be assigned to a designated image frame, e.g. data assigning a print format or the number of prints to the designated image frame. The optional data may be entered prior to the photography while being displayed on the display device in combination with the movie image of the subject. The optional data is written in the memory in association with the image data of the designated image frame after the photography. The optional data written in the memory may be displayed on the display device in combination with a still image of the designated image frame based on the data written in the memory. The optional data written in the memory may be revised by operating the manual data input means while observing the optional data on the display device.

According to another preferred embodiment, which is for use with a photo film cartridge whose container permits advancing the photo filmstrip out of the container by rotating a spool in an unwinding direction after having the filmstrip fully wound into the container, and the filmstrip has a magnetic recording layer, the still camera further comprises film advancing means which rotates the spool of the container in the winding direction, and a magnetic recording device for writing the optional data on the magnetic recording device.

When the container contains a developed photo filmstrip, and an ID code read from the developed filmstrip or the container coincides with the ID code stored in the memory, the still camera reads out the data from the memory and drives the display device to display a still image of image frames recorded on the developed photo filmstrip, accompanied with the frame number and the optional data, based on the data written in the memory. Thereby, the optional data may be revised by operating the manual data input means while observing the optional data on the display device. The revised optional data being rewritten on the magnetic recording layer and in the memory.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
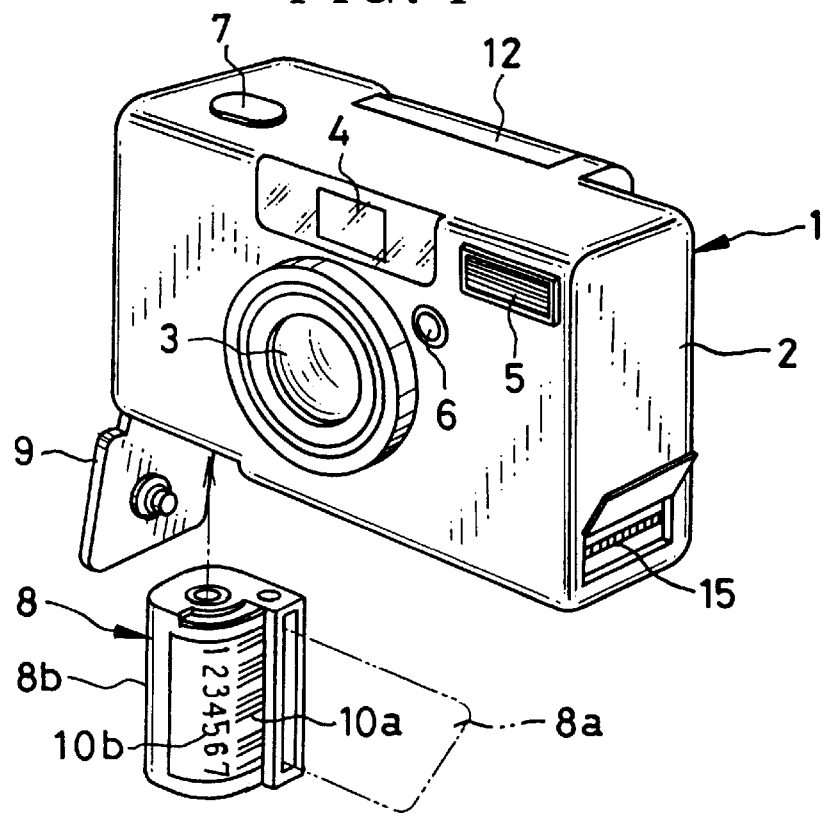
FIG. 1 is a front perspective view of a still camera according to an embodiment of the invention.
Figure 2:
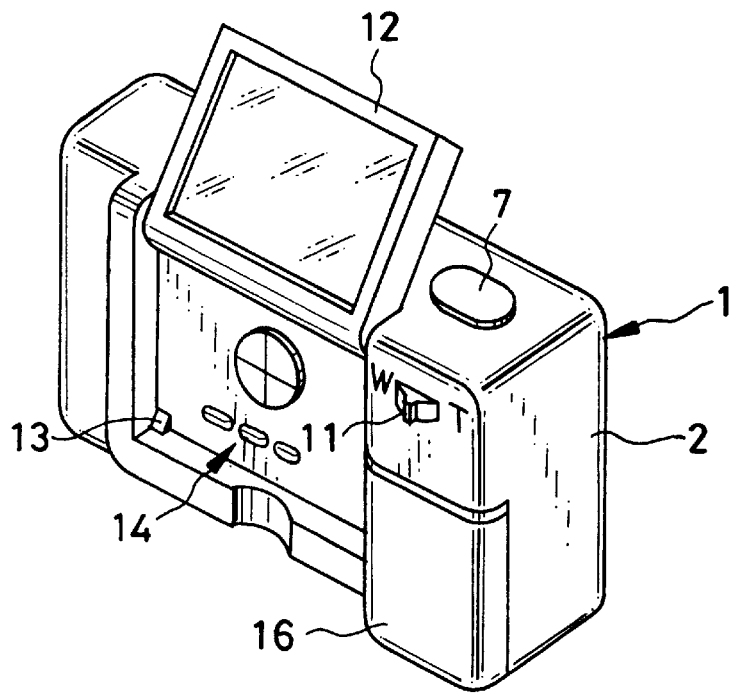
FIG. 2 is a rear perspective view of the still camera of FIG. 1.

Referring to FIGS. 1 and 2, a still camera 1 has a photographic lens 3, a viewfinder objective window 4, a flash window 5 and a photometry window 6 for measuring a subject brightness in a front side of a camera body 2. A light projector and a light receiver of a not-shown reflective photo sensor are disposed on opposite horizontal sides of the viewfinder objective window 4, for measuring a subject distance.

When a shutter button 7 on a top portion of the camera body 2 is depressed halfway, a subject brightness and a subject distance are measured for automatic exposure control and automatic focusing of the photographic lens 3.

A film cartridge 8 of IX240 type can be loaded by opening a bottom lid 9. The IX240 type film cartridge 8 has a container 8b which can entirely contain a filmstrip 8a therein and then advance a leader of the filmstrip 8a to the outside by rotating a spool of the container 8b. While the filmstrip 8a is contained, a film port of the container 8b is closed by a door member in a light-tight fashion. The door member can be opened by a key member inside the still camera 1.

The container 8b is labeled with a bar code 10a and a serial number 10b which constitute an ID code specific to each individual container 8b. The same ID code consisting of the same bar code and the same serial number is recorded as latent images on the filmstrip 8a that is contained in the container 8b. The bar code 10a is mechanically read by the still camera 1, or other devices such as a photo finishing apparatus. The serial number 10b permits visual identification of the film cartridge 8.

In the IX240 type, the filmstrip 8a after being developed by a photofinisher is rewound back into the container 8a having the same ID code when it is returned to the customer. Since the latent images of the ID code are developed concurrently with the development of the photographed images, the photofinisher can correlate the developed filmstrip 8a with the original container 8b.

A focal length changing lever 11 is disposed on a rear portion of the camera body 2, which is operated to change the focal length of the photographic lens 3 and, correspondingly, that of a viewfinder optical system 38 (see FIG. 3) which is disposed behind the viewfinder objective window 4.

An LCD monitor 12 is mounted to a back side of the camera body 2. The LCD monitor 12 serves not only as an information display device but also as a viewfinder that displays a view field corresponding to a photographic field of the photographic lens 3. As set forth in detail below, the LCD monitor 12 displays a movie image as the view field of the still camera 1 based on image data that is picked up through an area image sensor 39 on which an image of the view field is formed through the viewfinder optical system 38.

The LCD monitor 12 is hinged to the camera body 2 so as to be movable under an appropriate friction between a folded position shown in FIG. 1 and an elected position shown in FIG. 2. The elected position is inclined to the front of the camera body at 30 degrees from a vertical position. Because of the friction, the LCD monitor 12 can stop at an appropriate angular position other than the elected position. Because the LCD monitor 12 is constituted of a color LCD panel and a fluorescent light source for back-lighting the LCD panel, the LCD monitor 12 consumes a certain amount of electric power. A power switch 13 for the LCD monitor 12 is located to be surely turned off by the LCD monitor 12 as being set back to the folded position. Operation keys 14 are provided on a back side portion of the camera body 20 that appears when the LCD monitor 12 is elected.

A connector 15 is provided in one side of the camera body 2 and is covered with a flap. Through the connector 15, the still camera 1 may be connected to a peripheral apparatus in order to exchange image data. A door 16 is provided for loading batteries. A not-shown slot for a memory card is provided behind the door 16.

Figure 3:
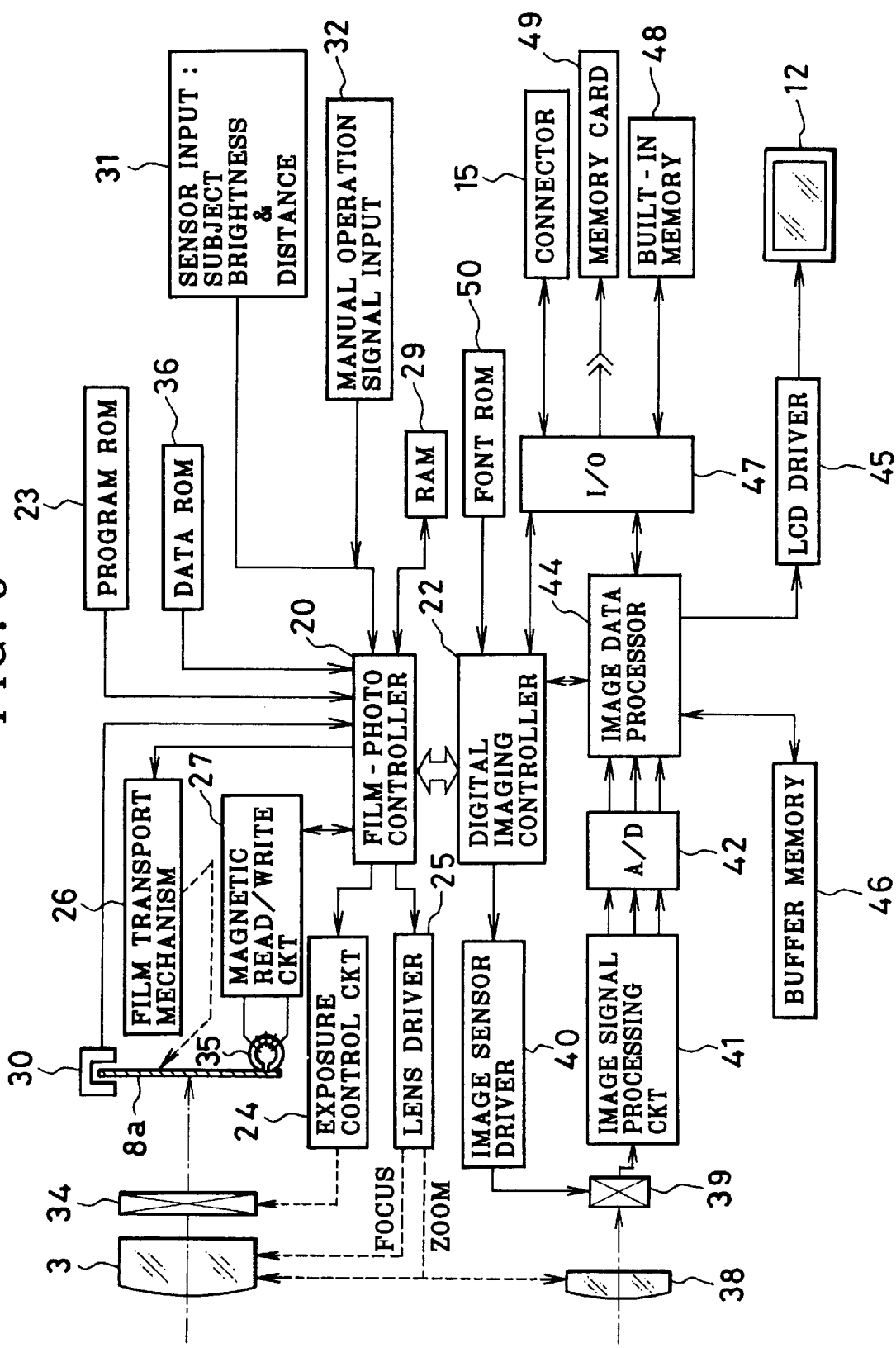
FIG. 3 is a block diagram of the camera of FIG. 1.

As shown in FIG. 3, the operation of the still camera 1 is controlled by a film-photo controller 20 and a digital imaging controller 22 which constitute a CPU. The film-photo controller 20 sequentially controls operations necessary for photographing images on the filmstrip 8a according to a sequence program written in a program ROM 23. The digital imaging controller 22 exchanges data and control signals with the film-photo controller 20, and controls operations necessary for picking up digital image data from the photographic subjects according to the sequence program written in the program ROM 23.

Specifically, the film-photo controller 20 controls an exposure control circuit 24, a lens driver 25, a film transport mechanism 26, and a magnetic read/write circuit 27, with reference to signals from a photoelectric perforation sensor 30 and those from a sensor input 31, including a subject brightness signal detected through the photometry window 6, and a subject distance signal detected through the reflective photo sensor behind the viewfinder objective window 4, as well as signals from a manual operation signal input 32, including a zooming signal from the focal length changing lever 11.

The exposure control circuit 24 controls a program shutter 34 on the basis of the subject brightness signal. The lens driver 25 drives the photographic lens 3 to focus on a subject range on the basis of the subject distance signal, and also drives the photographic lens 3 to zoom in and out in accordance with the zooming signal. The lens driver 25 drives the viewfinder optical system 38 to zoom in correspondence with the photographic lens 3.

The film transport mechanism 26 transports the filmstrip 8a one frame after each exposure. Since the filmstrip 8a of the IX240 type has a pair of perforations per frame, it is possible to transport the filmstrip 8a by one frame with reference to the perforations detected through the perforation sensor 30. By counting up the signal from the perforation sensor 30, the number of executed exposures, i.e. the serial number of the last exposed frame, is determined. The number of exposed frames is written in a RAM 29 after each exposure, and is used as frame counter data and frame serial number data of each frame.

The entire back surface of the IX240 type filmstrip 8a is coated with a transparent magnetic recording layer. The magnetic read/write circuit 27 drives a magnetic head 35 to write photo data and other data as a binary code on the recording layer during the one-frame transport of the filmstrip 8a after the exposure. The photo data written on the magnetic recording layer includes a shutter speed and a stop aperture size, the date of photography, and so forth. A formula for converting various data into binary codes is stored in a data ROM 36.

The magnetic head 35 is used for reading binary code from the magnetic recording layer. The binary code read through the magnetic head 35 is decoded by the film-photo controller 20 with reference to the conversion formula in the data ROM 36. The ID code of the filmstrip 8a is magnetically recorded on the magnetic recording layer at a leading portion of the filmstrip 8a, in addition to the latent images of the ID code. As soon as the film cartridge 8 is loaded in a cartridge chamber of the still camera 1, the ID code is read through the magnetic head 35 while the filmstrip 8a is automatically transported to position an initial frame exposure portion behind an exposure aperture. The ID code is written in the RAM 29. Alternatively, it is possible to provide a bar code reader inside the cartridge chamber to read the ID code from the bar code 10a.

The area image sensor 39 consists of 200,000 to 400,000 pixels, e.g. 380,000 pixels, whereas the viewfinder optical system 38 has a short focal length. Because of the depth of field of the optical system 38, useful image signals can be obtained through the image sensor 39 without the need for focusing the viewfinder optical system 38.

The digital imaging controller 22 controls the charge storage time of the image sensor 39 through an image sensor driver 40 in accordance with a subject brightness that is derived from feed-back signals fed back through an image signal processing circuit 41, an A/D converter 42 and an image data processor 44. However, it is possible to control the charge storage time of the image sensor 39 in accordance with the subject brightness signal from the sensor input 31.

The image signal processing circuit 41 separates the image signal from the image sensor 39 into three color image signals after amplifying it through an automatic gain controller or the like. The three color image signals are converted into digital color image data through the A/D converter 42. The digital color image data is processed in the image data processor 44 through a white balance control step, a gamma correction step, a matrix operation step and other processing steps, to produce image data of one frame. The image data is sequentially sent to an LCD driver 45 in a real time fashion, so the LCD monitor 12 displays a movie image as the view field of the still camera 1.

The image data processor 44 writes image data of one frame in a buffer memory 46 each time the shutter button 7 is depressed to expose the filmstrip 8a. Thereafter, the image data processor 44 transfers the image data stored in the buffer memory 46 through an I/O port 47 to a memory 48 built in the still camera 1 or to a memory card or card-type memory 49 that may be connected to the still camera 1. Simultaneously with writing image data of one frame in the built-in memory 48 or the card-type memory 49, the film-photo controller 20 reads the ID code of the film cartridge 8 and the frame serial number of that frame from the RAM 29, and sends them to the image data processor 44 through the digital imaging controller 22. Thus, the ID code and the frame serial number are written as frame ID data with the image data in the memory 48 or 49.

Accordingly, the image data processor 44 works not only as a device for producing image data from the image signal obtained through the image sensor 39, but also as a data writing device for writing image data of one frame in the buffer memory 46 and writing the image data and the frame ID data in the memory 48 or 49. Before being written in the memory 48 or 49, image data of one frame obtained by use of the 380,000-pixel image sensor 39 is compressed according to a standard quality JPEG compression. Thereby, the built-in memory 48 and the card-type memory 49 have only to have a capacity of 2 megabytes to 4 megabytes, in order to store image data of 40 frames, the maximum number available on the filmstrip 8*a*.

A font ROM 50 stores font data for use in displaying characters, symbols and marks on the LCD monitor 12. For example, when the number of frames exposed on the filmstrip 8*a* is to be displayed on the LCD monitor 12, the film-photo controller 20 reads the number of executed exposures from the RAM 29, and sends it as the frame counter data to the digital imaging controller 22. Then, the digital imaging controller 22 refers to the font ROM 50 to read suitable font data for displaying the number of exposed frames, and sends the font data to the image data processor 44. The image data processor 44 sends the font data with image data to the LCD driver 45 so the LCD monitor 12 displays the number of exposed frames on the LCD monitor 12 in combination with the view field image. The LCD monitor 12 can display various information or images in combination with or in place of the view field image, as set forth in detail below.

The film-photo controller 20 and the digital imaging controller 22 can operate independently of the photography sequence, in response to command signals entered through the manual operation signal input 32 by operating the operation keys 14, or by operating a keyboard or a mouse of a personal computer connected to the still camera 1 through the connecter 15. Therefore, it is possible to transfer data from the built-in memory 48 to the card-type memory 49 and vise versa. After the completion of exposures on the filmstrip 8*a*, it is possible to designate a particular frame on the filmstrip 8*a* and read data written on the magnetic recording layer in association with the particular frame. It is also possible to read out image data and associated data of one frame from the memory 48 or 49, and display a still image of the frame along with the frame serial number on the LCD monitor 12.

Figure 4:
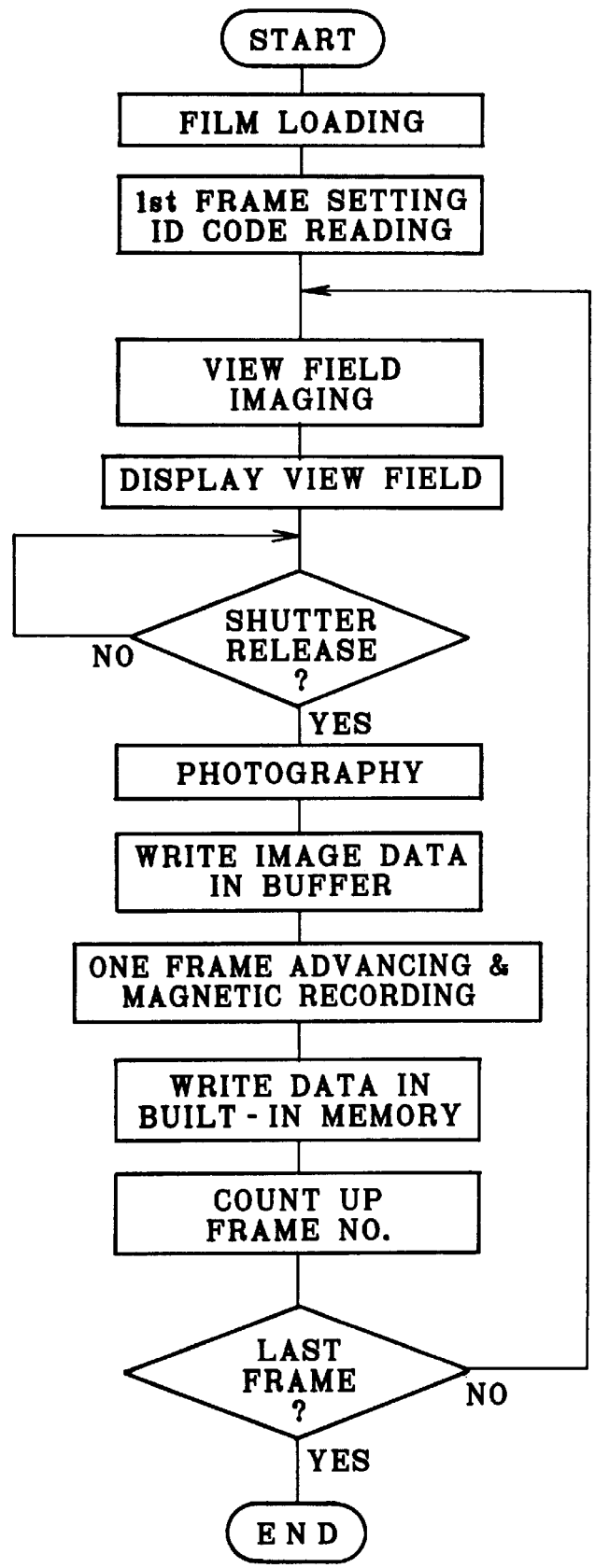
FIG. 4 is a flow chart illustrating an operation of the camera of FIG. 1.

Now the operation of the still camera 1 will be described with reference to FIG. 4.

The film cartridge 8 is loaded in the camera body 2 through the bottom lid 9 open. After the bottom lid 9 is locked in its closed position, the not-shown key member of the still camera 1 is actuated to open the door member of the container 8*b*. Then, the film transport mechanism 26 starts rotating the spool of the container 8*a* to advance the leading end of the filmstrip 8*a* out of the container 8*b*.

When the perforation sensor 30 detects that the perforation indicating the first frame exposure portion moves to a predetermined position, the film transport mechanism 26 stops to position the first frame exposure portion behind the exposure aperture. While the 8*a* is transported in this way, the magnetic head 35 of the magnetic read/write circuit 27 reads data recorded on the magnetic recording layer in the leading end of the 8*b*, including data of the ID code, a film type, and the number of available exposures.

The data read through the magnetic read/write circuit 27 is decoded by the film-photo controller 20, and is written in the RAM 29. The film type data is utilized for the automatic exposure control, and the number of available exposure are utilized for setting a maximum value of a frame counter incorporated in the film-photo controller 20.

When the LCD monitor 12 is elected, the power switch 13 is turned on, so that the sensor driver 40 starts driving the image sensor 39 under the control of the digital imaging controller 22, to pick up image signals from the image of a subject formed through the viewfinder optical system 43. The image signals is processed through the image signal processing circuit 41, the A/D converter 42 and the image data processor 44, producing image data. The image data is supplied to the LCD monitor 12 through the LCD driver 45, so the LCD monitor 12 displays a movie image of the subject as the view field image in the real time. Thus, the photographer frames the subject, observing the LCD monitor 12.

Figure 5A:
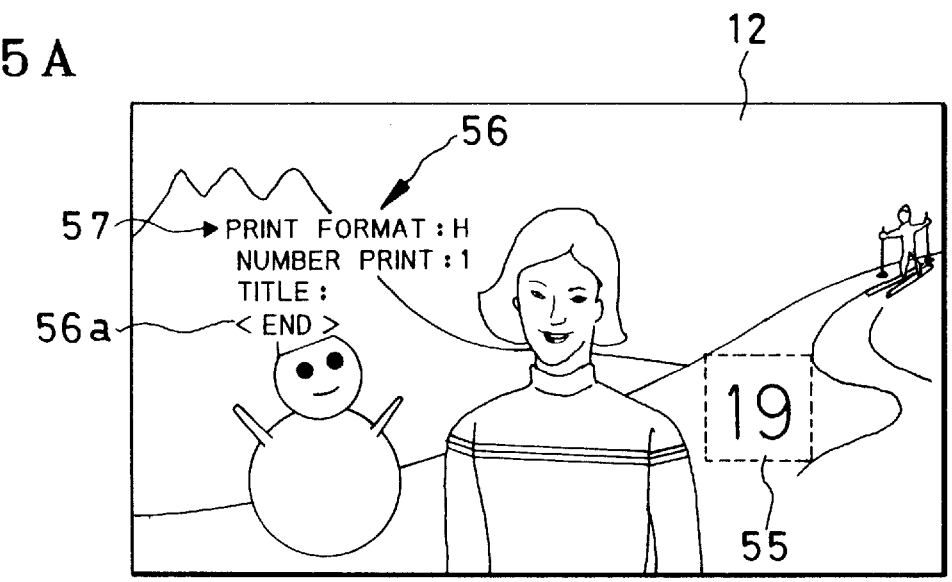
FIGS. 5A, 5B and 5C are explanatory views illustrating an operation for setting print option data on an LCD prior to photography.

FIG. 5A shows an example of view field image displayed on the LCD monitor 12. As known in the art, the default size of the image frame on lo the IX240 type filmstrip 8*a* is so-called high-vision size whose aspect ratio is about 9:16, which is wider than the conventional 35 mm film full size frame whose aspect ratio is about 2:3. Therefore, the LCD monitor 12 displays the view field image in the high-vision size. Hereinafter, the high-vision size will be referred to as H-size, while a size having the same aspect ratio as the conventional 35 mm film full size will be referred to C-size.

The operation keys 14 include a print option key for designating the number of prints to be made from a frame, or for assigning a particular print format to a frame. That is, the photographer can designate an image frame to be printed in C-size by writing print option data designating the C-size print format on the magnetic recording layer of the filmstrip 8*a* and in the built-in memory 48 or the card-type memory 49 in association with that image frame. Then, a printer reads the print option data and makes a C-size photograph, e.g. 89 mm×127 mm, by masking or clopping left and right sides of the H-size frame on the filmstrip 8*a*. In the same way, it is possible to designate an image frame to be printed in a wider panoramic size (P-size) than H-size, having an aspect ratio of 1:3. In that case, a P-size photograph, e.g. 89 mm×254 mm, is made by clopping upper and lower sides of the H-size frame. Without any manual designation, the image frame on the filmstrip 8*a* is printed as a H-size photograph, e.g. 89 mm×159 mm.

If the photographer wants a C-size photograph, or a P-size photograph, the photographer may operate the print option key prior to an exposure. Then, default values of print option data 56 are displayed on the LCD monitor 12, superimposed on the view field image, as shown in FIG. 5A. On the other hand, frame number data 55 showing the latest number of exposed frames is always displayed on the LCD monitor 12.

Figure 5B:
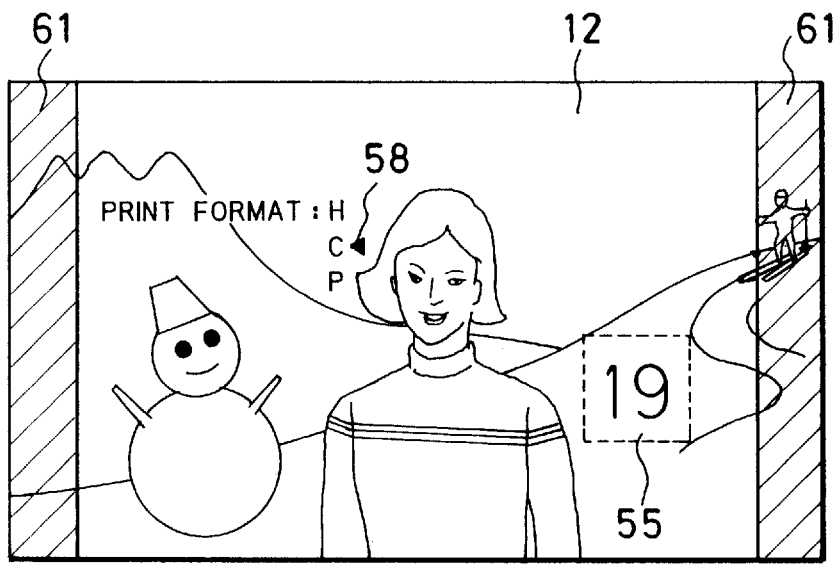

A cursor 57 is displayed on the left side of the print option data 56, pointing at an item whose content is able to change at present. The photographer can moves the cursor 57 by operating a cursor key of the operation keys 14, to designate the item to change. Since the photographer wants to change the print format, in this instance, the photographer moves the cursor 57 to an item "PRINT FORMAT", and pushes an enter key of the operation keys 14. Then, characters "H", "C" and "P" appear in a column on the right side of the item "PRINT FORMAT", while other items of the print option data 56 disappear, as shown in FIG. 5B. A cursor 58 is then displayed on the right side of the characters "H", "C" and "P".

Figure 5C:
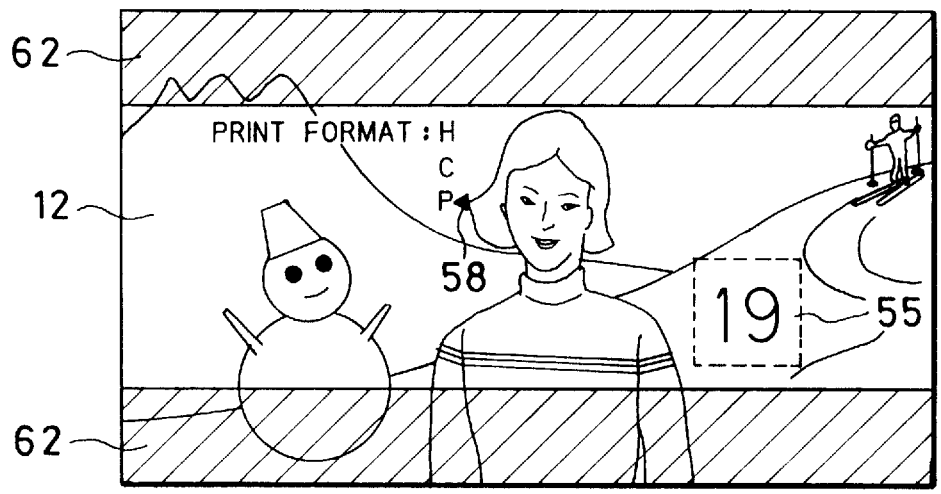

As the characters "H", "C" and "P" represent H-size, C-size and P-size respectively, one of these sizes may be selected by pointing a corresponding one of the characters "H", "C" and "P" by the cursor 57. When the cursor 57 points at the character "H", the LCD monitor 12 displays the view field image in the H-size, as shown in FIG. 5A. When the cursor 57 points at the character "C", the digital imaging controller 22 reads out format data for masking from the font ROM 50, and displays a pair of masks 61 on the left and right sides of the LCD monitor 12 to confine the view field image in the C-size, as shown in FIG. 5B. When the cursor 57 points at the character "P", a pair of masks 62 are displayed on the upper and lower sides of the LCD monitor 12 to confine the view field image in the P-size, as shown in FIG. 5C, according to the masking format data read from the font ROM 50. For example, these masks 61 and 62 are semi-transparent gray masks, but may be screen tone masks with black dots.

When the enter key is pushed while the cursor 57 points at one of the three characters, e.g. "C", the LCD monitor 12 displays all items of the print option data 56 again in the same way as shown in FIG. 6A, but the masks 61 remain being displayed and the character "C" is displayed on the right side of the item "PRINT FORMAT".

To set up a title, the cursor 57 is shifted to the item "TITLE", and the enter key is pushed. Then, a variety of titles are displayed with the cursor 58 on the right side of the item "TITLE". By pointing the cursor 58 at one of the titles and pushing the enter key, the title is decided.

To designate the number of prints, the cursor 57 is shifted to the item "NUMBER PRINT", and the enter key is pushed. Then, the number displayed on the right side of the item "NUMBER PRINT" starts winking. By operating the cursor key in a direction to move the cursor 57 upward or downward, the winking number increases or decreases respectively. When the winking number reaches the desired number of prints, the enter key is pushed to fix the number. Then, the print option data 56 is displayed again in the same way as shown in FIG. 5A.

After the designation of the print format, the title and/or the number of prints is accomplished, the cursor 57 is shifted to an indicia <END>56a on the LCD monitor 12, and then the enter key is pushed. Thereby, the print option data 56 disappears, and the selected values of the respective items are written in the RAM 29. In case the manual designation is not effected, the default values of the print option data 56 are written in the RAM 29. However, the above designation is not necessarily made prior to the exposure, because it is possible to designate or rewrite the print format, the title and/or the number of prints after the filmstrip 8a is developed, as will be described in detail below.

When the shutter button 7 is depressed halfway, the photographic lens 3 is focused in accordance with subject range data derived from the subject distance signal. Simultaneously, the subject range data is sent to the exposure control circuit 24. When the shutter button 7 is fully depressed, the exposure control circuit 24 actuates the program shutter 34 to make an exposure. A signal generated upon the full depression of the shutter button 7 is also sent to the digital imaging controller 22 through the film-photo controller 20, whereupon image data of one frame picked up at that moment is stored in the buffer memory 46.

After the program shutter 34 completes the exposure, the film-photo controller 20 activates the film transport mechanism 26 to advance the filmstrip 8a by one frame. During the one-frame advance of the filmstrip 8a, the magnetic head 35 is driven through the magnetic read/write circuit 27, to write data on the magnetic recording layer of the filmstrip 8a along a margin of the just exposed frame. The data written at that time includes the shutter speed and the stop aperture size used for the exposure, the date of photography, the frame serial number, and the print option data. It is possible to provide character data enter keys as part of the operation keys 14, to enter an appropriate message by operating the character data enter keys, and write it on the magnetic recording layer.

After the magnetic read/write circuit 27 finishes writing the data on the magnetic recording layer and the filmstrip 8a is advanced by one frame, the digital imaging controller 22 requires the image data processor 44 to transfer the image data of one frame from the buffer memory 46 to the built-in memory 48 through the I/O port 47.

Simultaneously, the digital imaging controller 22 requires the film-photo controller 20 to read and send the frame ID data, i.e. the film ID code and the frame number, from the RAM 29 to the digital imaging controller 22. The frame ID data is written along with the image data in the built-in memory 48.

Figure 6:
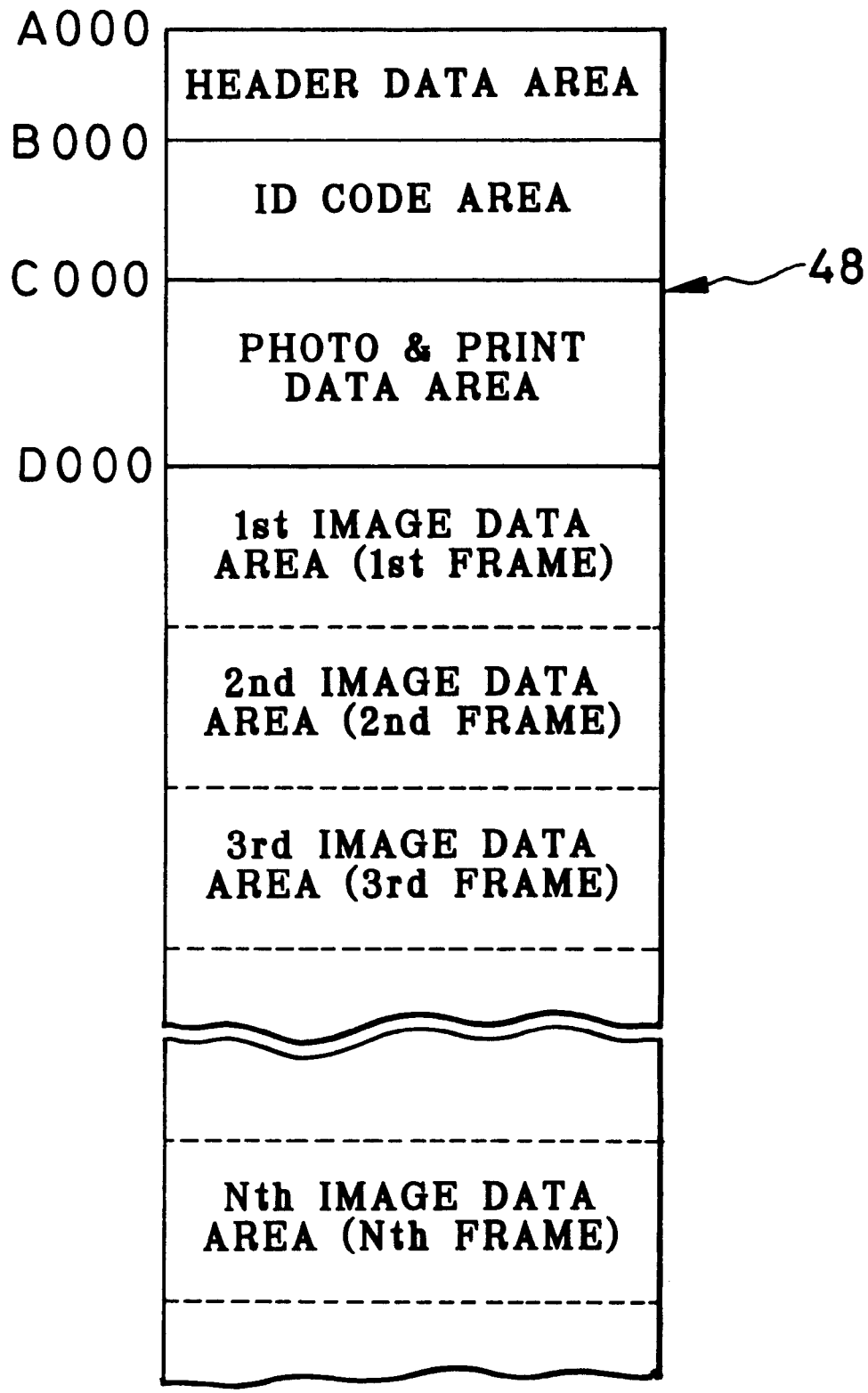
FIG. 6 is a conceptual view of a memory map of a memory built-in the camera of FIG. 1.

As shown in FIG. 6, the built-in memory 48 stores header data in memory locations whose initial address are "A000", hereinafter called the header data area. The header data includes initial address data of respective memory locations, each storing image data of one-frame, frame ID data, or photo data and print option data relating to each frame. The header data also includes memory capacity data of the respective memory locations. The memory locations for frame ID data, having an initial address "B000", will be called the ID code area. The memory locations with an initial address "C000" will be called the photo and print data area. The photo and print data area is for storing the same photo data and print option data as written on the magnetic recording layer during the one-frame advancing. The memory locations for image data, having an initial address "D000", will be called the image data area.

In this embodiment, the image data area can store image data of at most 50 frames. The image data of the first to Nth frames is stored sequentially in the first to Nth image data areas with the same memory capacity. In the ID code area and the photo and print data area, data of each frame is allocated the same number of bits, so the ID code area and the photo print data area can store data for at most 50 frames each. For example, frame ID data of the first frame on the filmstrip 8a is written in the ID code area, while image data of the first frame is written in the first image data area.

In this way, each time a frame is photographed on the filmstrip 8a, photo data and print option data is magnetically written on the filmstrip 8a, and image data of the same image as contained in the photographed frame is stored in the buffer memory 46, and then the image data, the photo data and the print option data are written in the built-in memory 48 in association with the frame ID data.

After all available frames are photographed and image data and additional data of the last frame is written in the built-in memory 48, the film-photo controller 20 drives the film transport mechanism 20 to rewind the filmstrip 8a back into the container 8b. When the entire length of the filmstrip 8a is contained in the container 8b, the door member of the container 8a is closed. Then, the film cartridge 8 is removed from the still camera 1 through the bottom lid 9, and is forwarded to a photofinisher for development.

The developed filmstrip 8a is rewound back into the container 8a having the same ID code, and is returned to the photographer. If the photographer wants to rewrite the print option data that was written during the photography, the film cartridge 8 containing the developed filmstrip 8*a* is loaded again in the still camera 1. The still camera 1 detects that the loaded film cartridge 8 is a used one, and displays a warning on the LCD monitor 12. Thereafter when a reproduction key of the operation keys 14 is operated, the digital imaging controller 22 compares the ID code of the loaded film cartridge 8 with the ID code stored in the built-in memory 48.

If these ID codes are identical, the warning disappears, and the digital imaging controller 22 reads the image data and other data associated with each frame from the built-in memory 48, to display the image of each individual frame accompanied with the frame number data 55 on the LCD monitor 12 in a sequential fashion. If these ID codes are not identical, the digital imaging controller 22 gives another warning.

Figure 7A:
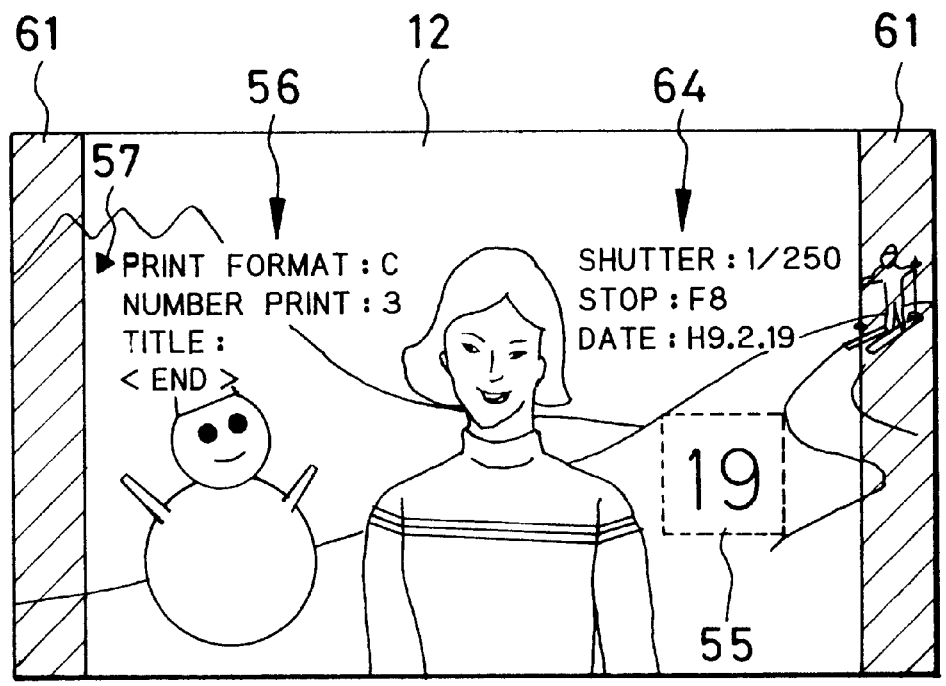
FIG. 7A is an explanatory view illustrating an operation for confirming image data, photo data and print option data stored in the built-in memory on the LCD after photography.

When the image of the aimed frame is displayed on the LCD monitor 12, the reproduction key is operated again, to stop the frame shifting on the LCD monitor 12. If the aimed frame is designated to be printed in C-size prior to the exposure of that frame, the masks 61 appears on the right and left sides of the image on the LCD monitor 12, as shown in FIG. 7A. Thereafter when the print option key is pushed, the LCD monitor 12 displays both print option data 56 and photo data 64 of the displayed frame, as shown in FIG. 7A.

As the cursor 57 also appears with the print option data 56, it is possible to move the cursor 57 by the cursor key to point at the item to revise. Needless to say, the photo data 64 is unchangeable, so the cursor 57 would not move to the photo data 64.

Figure 7B:
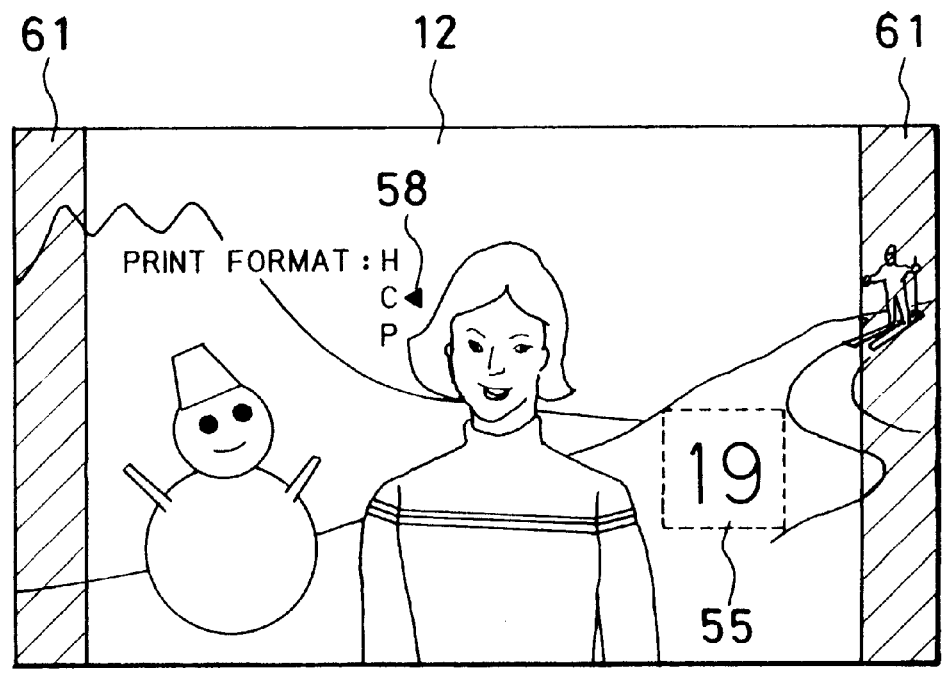
FIGS. 7B and 7C are explanatory views showing an operation of revising print option data on the LCD after photography.
Figure 7C:
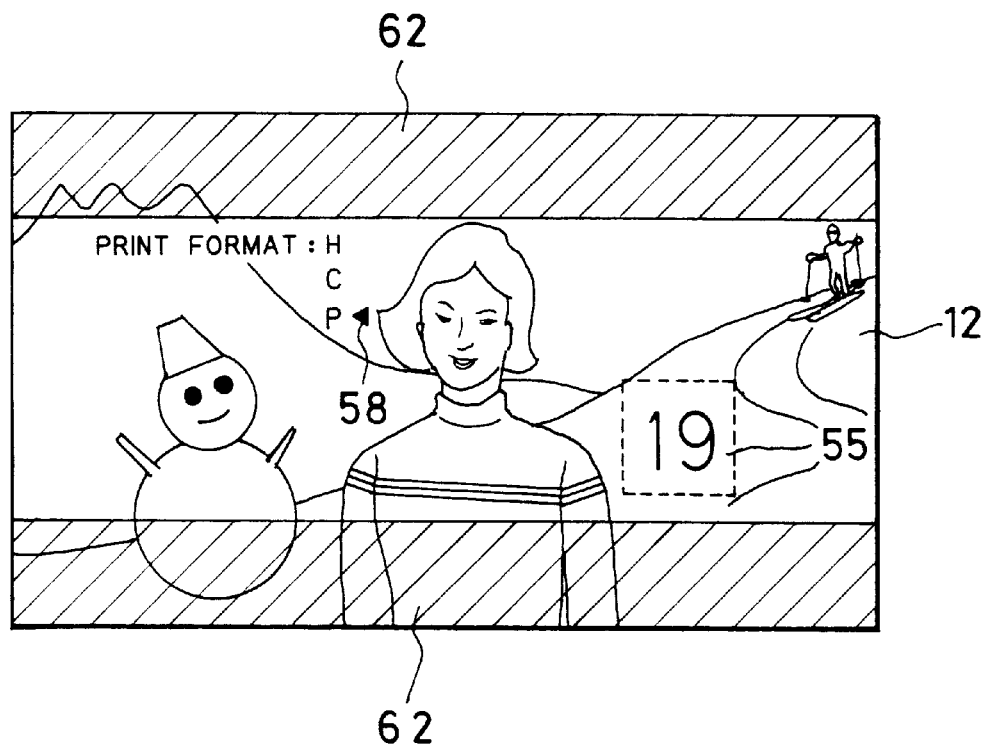

Each data item of the print option data 56 can be changed in the same way as described above with reference to FIGS. 5A to 5C. FIGS. 7B and 7C shows the example of changing the print format.

Figure 7D:
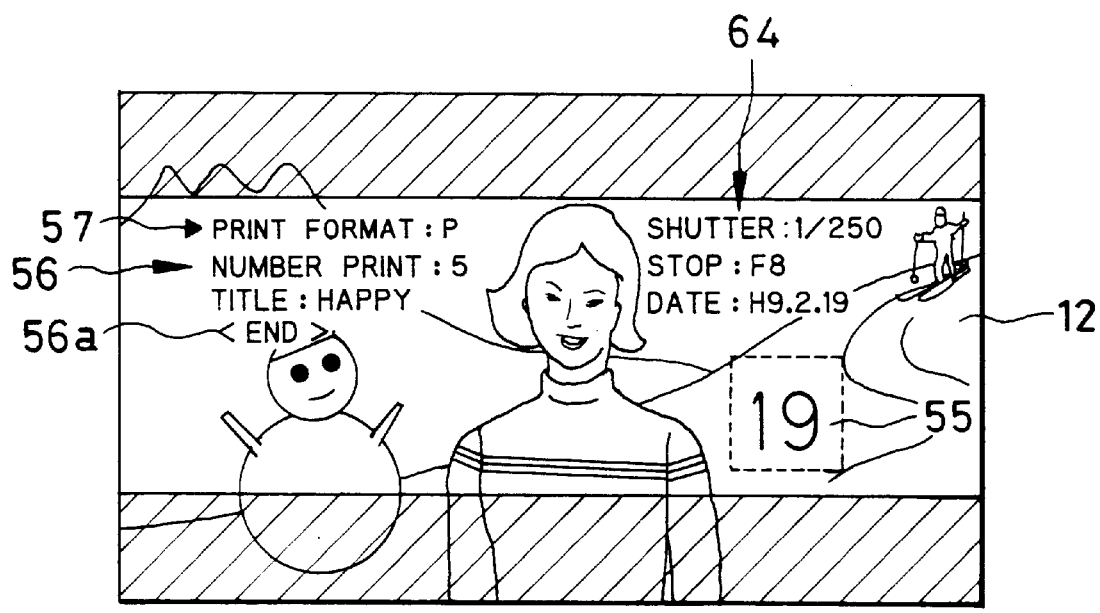
FIG. 7D is an explanatory view showing an example of display on the LCD after revising the print option data.

When the print option data 56 on the LCD monitor 12 is revised, for example, as shown in FIG. 7D, and the data revision is terminated by pushing the enter key while pointing at the indicia <END>56*a*, the print option data of the displayed frame is correspondingly revised in the photo and print data area of the built-in memory 48. Thereafter, the film transport mechanism 26 is driven to advance the filmstrip 8*a* out of the container 8*a* and feed the corresponding frame on the filmstrip 8*a* to the exposure position behind the exposure aperture at a high speed. Next, the filmstrip 8*a* is advanced by one frame at the same speed as usual one-frame advancing, and the magnetic head 35 is driven to rewrite the print option data of the corresponding frame, i.e. the frame No.19 in the shown example.

Independently of the movement of the filmstrip 8*a*, the LCD monitor 12 continues to display the same frame along with the print option data 56, the photo data 64 and the frame number data 55 so long as the reproduction key is not operated again. Therefore, it is possible to revise the print option data again. When the reproduction key is operated, the following frames are seriatim displayed with the frame number data 55 on the LCD monitor 12. Thereafter, the print option data of other frames may be revised in the same way as above.

It is possible to rewrite the print option data before the film cartridge 8 is removed from the still camera 1 after the completion of exposure of all available frames on the filmstrip 8*a*, in the same way as described with reference to FIGS. 7A to 7C. The built-in memory 48 need not store all the magnetically written data pieces in the photo and print data area, but may store part of those data pieces, e.g. only print option data. The card-type memory 49 is used to store image data with other associated data in the same way as the built-in memory 48, in addition to or in place of the built-in memory 48. Thereby, memory capacity for image data and other data is easy to increase. Although the capacity of the memory 48 or 49 of the above embodiment is designed to store data for a 40-exposure size filmstrip of IX240 type, their capacity may be larger enough to store data for two or more filmstrips.

Figure 8:
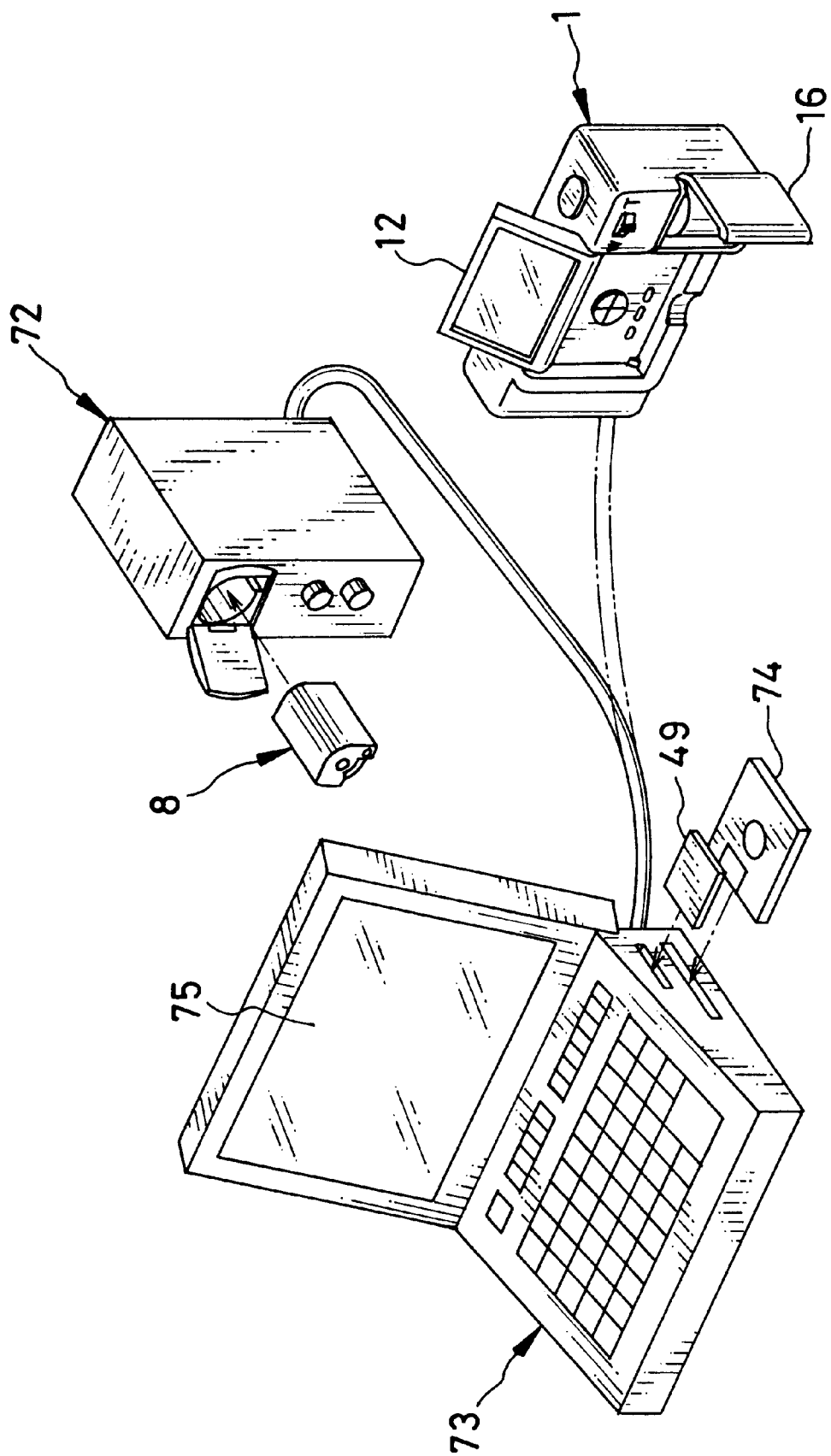
FIG. 8 is a schematic view of an image processing system including the still camera of FIG. 1.

FIG. 8 shows an image processing system wherein the still camera 1 is combined with a film scanner 72 and a personal computer 73. The still camera 1 is connected to the personal computer 73 through the connector 15, and the personal computer 73 is loaded with a magnetic disc 74 storing a system program. Thereby, it is possible to operate the still camera 1 in the reproduction mode through a keyboard of the personal computer 73, so as to transfer the image data from the built-in memory 48 of the still camera 1 to a built-in memory or hard disc of the personal computer 73, along with the frame ID data, photo data and print option data.

It is possible to seriatim display the images of the individual frames on the LCD monitor 12 and designate those frames whose image data is wanted to transfer to the hard disc of the personal computer 73. Once the image data is transferred to the personal computer 73, the images of the frames as well as the frame ID data, i.e. the ID code and the frame number, can be displayed on a monitor screen 75 of the personal computer 73.

The image data stored in the built-in memory 48 is so rough that the hard disc of the personal computer 73 can store the image data of 40 frames with no problem. If the capacity of the hard disc of the personal computer 73 is not enough, the card-type memory 49 may be connected to the personal computer 73.

Since the data capacity of the image data stored in the built-in memory 48 is small, the hard disc of the personal computer 73 can store the image data for a plurality of filmstrips. That is, the hard disc of the personal computer 73 may be utilized as a random file for storing index images of frames of several filmstrips.

The photographer can see the index images of each filmstrip on the monitor screen 75 at any time even when the film cartridge 8 is absent, for example, for development. As the ID code and the frame number are displayed with each index image, it is easy to identify the individual frames. Since the photo data and the print option data is also transferred to the hard disc of the personal computer 73, it is easy to check the exposure condition and the date of photography of each frame. The image data may be stored in a magnetic sheet or a card-type memory which is externally attachable to the personal computer 73.

The image data stored in the built-in memory 48 and thus the hard disc of the personal computer is so rough that it not useful for high-quality image processing, though it is useful for displaying index images. In order to obtain high-quality image data, the film cartridge 8 with the developed filmstrip 8*a* is set in the film scanner 72 that is then connected to the personal computer 73.

When the film cartridge 8 is positioned in a cartridge chamber, the film scanner 72 advances the developed filmstrip 8*a* out of the container 8*a* of the film cartridge 8 in the same way as the still camera 1 does. Thereafter while the filmstrip 8*a* is transported, a line image sensor scans the frames on the filmstrip 8*a* to output image data of the frames. The line image sensor of the image scanner may have a definitely higher resolving power than the area image sensor 39 of the still camera 1, e.g. 1.5 million to several million pixels per frame. Therefore, remarkably greater scale of image data is obtained through the film scanner 72 in comparison with the image data obtained from the built-in memory 48 or the card-type memory 49.

If all frames of the filmstrip 8a are to convert into image data and write in the hard disc of the personal computer 73 and other recording medium like optical discs, it takes an enormous memory capacity and an enormous amount of data processing time for storing the image data. Accordingly, it is efficient to use the film cartridge 8 with the developed filmstrip 8a directly as a sequential image data file.

To use the film cartridge 8 with the developed filmstrip 8a as a sequential image data file, the user observes index images of the frames on the filmstrip 8a while displaying them in turn or in groups on the monitor screen 75 based on the image data transferred to the hard disc of the personal computer 73 from the built-in memory 48 of the still camera 1. Since the hard disc of the personal computer 73 stores frame ID data, photo data and print option data of the frames along with the image data, it is possible to retrieve the image data by use of the frame ID data, the photo data or the print option data to designate the desired frame or frames, and display an index image of the designated frame on the monitor screen 75. The program for the image data retrieval is stored in the magnetic disc 74.

As the index image and the frame ID data, i.e. an ID code and a frame number, may be displayed on the monitor screen 55, it is possible to identify the film cartridge 8 that contains the filmstrip 8a having the displayed image. After setting the identified film cartridge 8 in the film scanner 72, the user enters the frame number through the keyboard of the personal computer 73. Then, the film scanner 72 reads the ID code of the filmstrip 8a from the magnetic data on the developed filmstrip 8a or the bar code on the container 8b, to confirm the coincidence with the designated ID code. Thereafter, the frame of the designated frame number is scanned by the image sensor to obtain high-definition image data.

The high-definition image data is stored in the hard disc, so that it is possible to make a variety of image processing on the basis of the high-definition image data. It is of course possible to make a hard copy by connecting a video printer to the personal computer 73.

In this way, by scanning image data of only one or several frames necessary to process and storing it in the hard disc of the personal computer 73, the hard disc having a small capacity is applicable. Since the quantity of processing data used for processing the image data is very small in comparison with the quantity of the processed image data, it is preferable to store only the processing data in the hard disc without storing the processed image data. When to get the processed image data again, the film cartridge 8 of the developed filmstrip 8a having the corresponding frame is set in the film scanner 72 to obtain the high-definition image data again, and the image data is processed by use of the processing data stored in the hard disc.

According to the image processing system shown in FIG. 8, the still camera 1 as well as the personal computer 73 does not need a large capacity memory, because the still camera 1 have only to store rough image data for index images along with frame ID data. This is advantageous in view of compactness and cost.

It is possible to provide a line image sensor in the still camera 1 to scan the frames on the developed filmstrip 8a. In that case, the still camera 1 is connected to the personal computer 73 through the connector 15, and the rough image data stored in the built-in memory 48 is transferred to the hard disc of the personal computer 73 and, thereafter, the line image sensor of the still camera 1 is activated in a scanning mode.

Although the above embodiments relate to the still camera for the IX240 type film cartridge, the present invention is not limited to the IX240 type, but is applicable to any type film cartridge if only it has its own ID code or it can contain a filmstrip after development in form of a roll. If the developed filmstrip is provided with visual ID codes and frame numbers, or magnetic frame ID data thereon in association with the respective frames, it is not always necessary to wind the developed filmstrip into the container.

It is also possible to store data relating to the respective frame, i.e. frame ID data, photo data and print option data, in an IC memory that is incorporated into a container of a film cartridge, instead of writing it on the magnetic recording layer of the filmstrip. In that case, the filmstrip does not need a magnetic recording layer.

Furthermore, it is possible to incorporate a memory into a container of the film cartridge 8. In that case, the image data and other data read from the built-in memory 48 is written it in the memory of the container after the completion of all available exposures in the film cartridge 8. According to this configuration, the filmstrip 8a functions as the sequential data file or memory of the high-definition image and the memory of the container 8a functions as an index image memory storing rough image data and other additional data. Since the image data file and the index image memory are integrated into one body, i.e. the film cartridge 8, this system is highly efficient and easy to handle. According to this configuration, it is possible to omit the ID code.

Meanwhile, as the LCD monitor 12 is constituted of the color LCD panel and the fluorescent light source for backlighting the LCD panel, the LCD monitor 12 consumes a certain amount of electric power. Conventional digital still cameras with an LCD monitor consumes four AA-type alkali batteries in two hours or so in average. Since the camera for photography on silver-salt film also consumes electric power for winding film, for the automatic exposure control and the automatic focusing, the still camera 1 that is provided with the film-photo function and the digital imaging function as well as the LCD monitor 12 would consume batteries in a shorter time. If the photographer does not prepare for spare batteries, the photographer can miss the shutter chance.

JPA 4-184484 discloses a digital still camera or electronic still camera which saves the power consumption by turning on a back light of an LCD viewfinder only for a limited time before the photography and while the photography mode of the camera is to be changed, e.g. between a shutter speed priority mode, an aperture-priority mode, manual mode etc. However, activating the back light for a limited time from the time of switching from an operating condition to a standby condition, or from the time of actuation of a mode changing switch has problems. That is, if the back light activation time is too short, the LCD viewfinder turns off frequently, and the photographer is likely to miss the shutter chance. If the back light activation time is too long, it cannot be efficient to save the power consumption.

Figure 9:
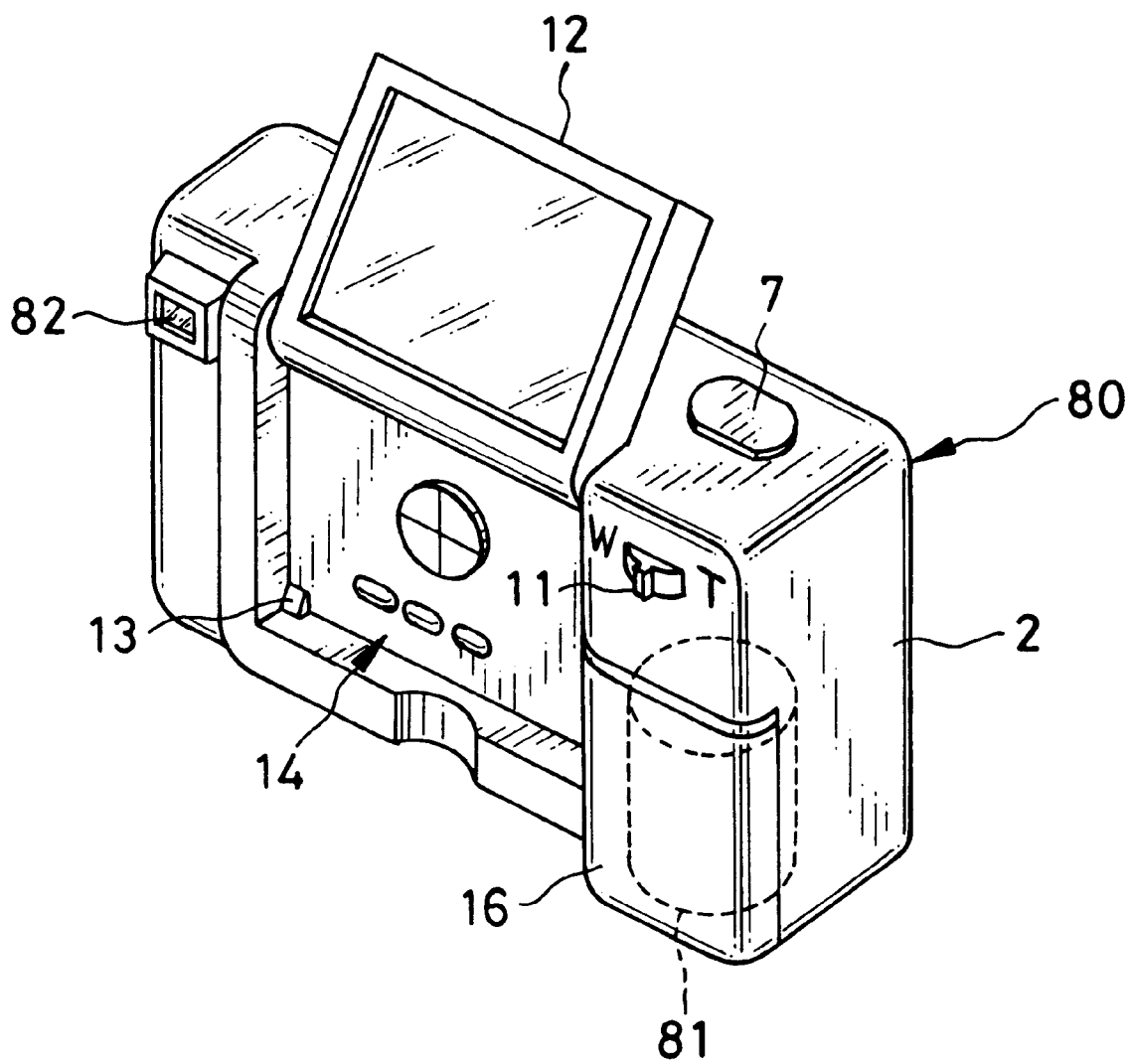
FIG. 9 is a rear perspective view of a still camera according to a second embodiment of the invention.
Figure 10:
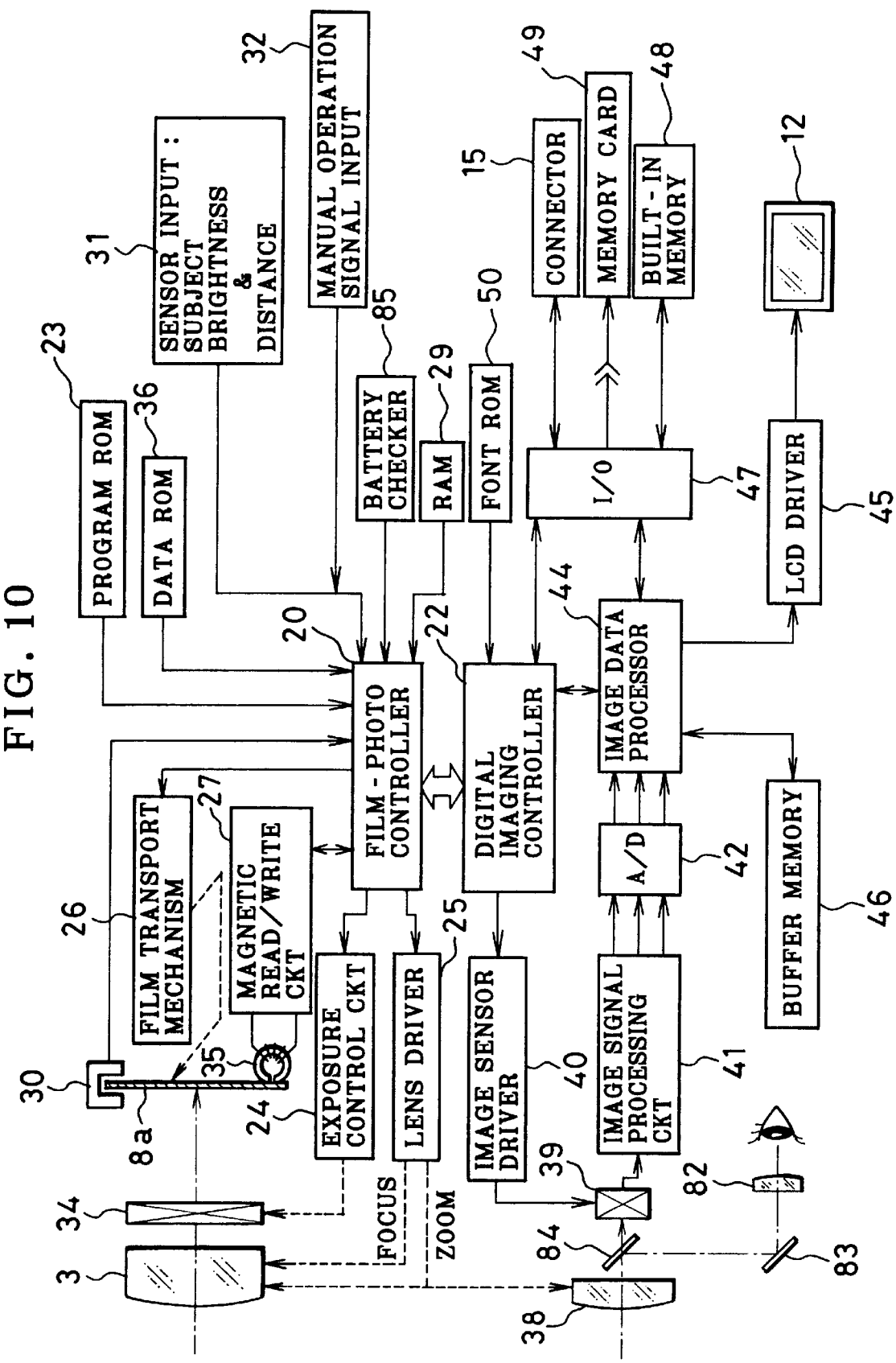
FIG. 10 is a block diagram of the still camera of FIG. 9.

A still camera 80 shown in FIG. 9 is made to solve this problem. The still camera 80 is provided with an eyepiece 82 which is optically connected to a viewfinder optical system 38 through a deflection mirror 83 and a half mirror 84, as shown in FIG. 10. Thereby, the photographer can view the photographic field by looking into the eyepiece 82, in addition to an LCD monitor 12.

Figure 11:
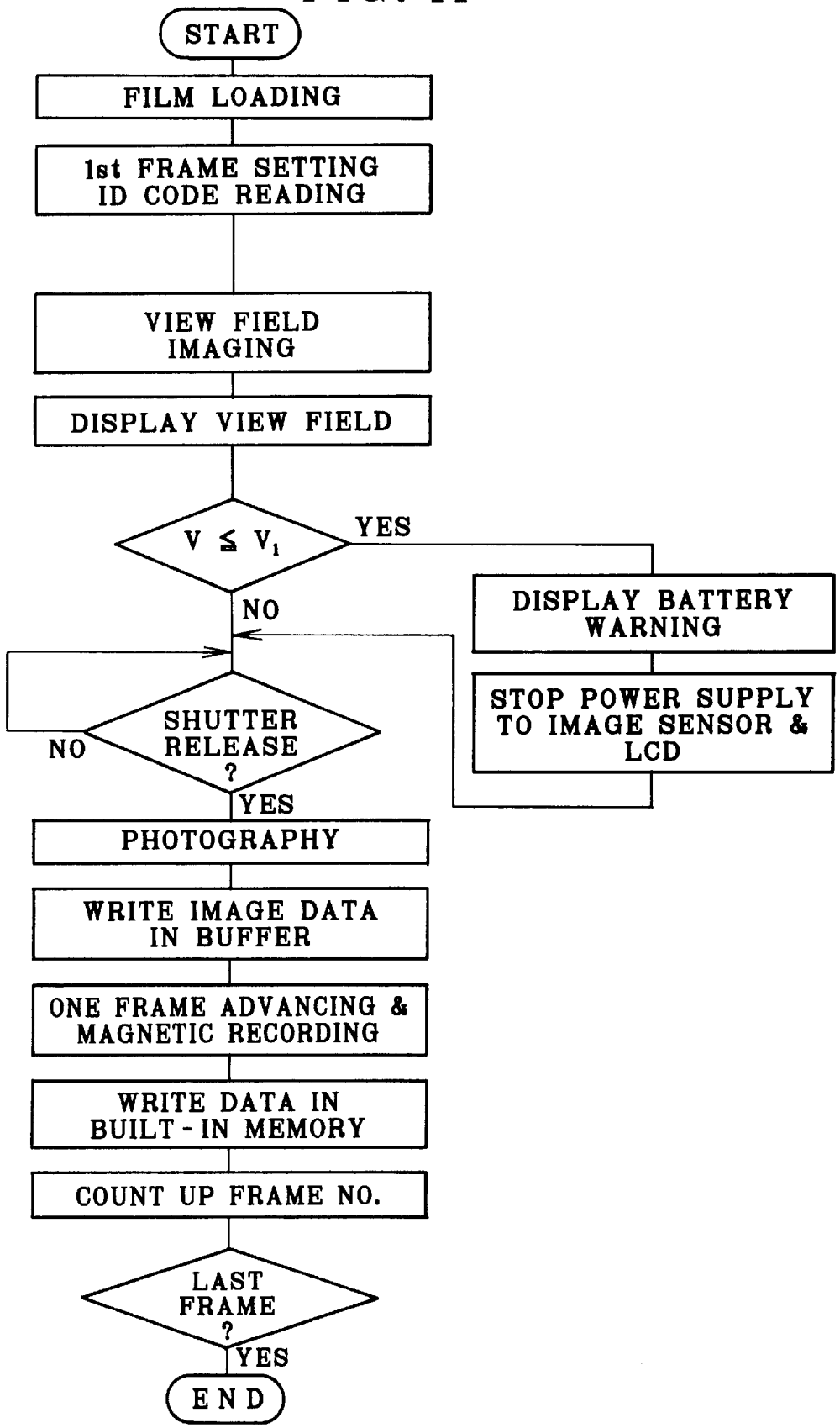
FIG. 11 is a flow chart illustrating an operation of the still camera of FIG. 9.

A battery 81 is loaded in a camera body 2 through a rear lid 16. A battery checker 85 is connected to a film-photo controller 20, to check the voltage V of the battery 81 with a minimum voltage V1 necessary for driving components necessary for digital imaging, such as an image sensor 39 and the LCD monitor 12. As shown in FIG. 11, when the voltage V drops down to the reference voltage V1, a battery warning, e.g. a winking symbol of battery, is displayed on the LCD monitor 12 for a limited time, e.g. 10 seconds, and then the power supply to the LCD monitor 12 and the image sensor 39 is interrupted.

On the other hand, film-photo components necessary for photography on silver-salt film consume less electric power in comparison with the LCD monitor 12 and the image sensor 39, so that the film-photo components can work even after the voltage V goes below the reference voltage V1. Since there is the eyepiece 82, it is possible to continue film-photography after the LCD monitor 12 is turned off. It is of course possible to provide a power source for the film-photo components separately from the digital imaging components.

Figure 12A:
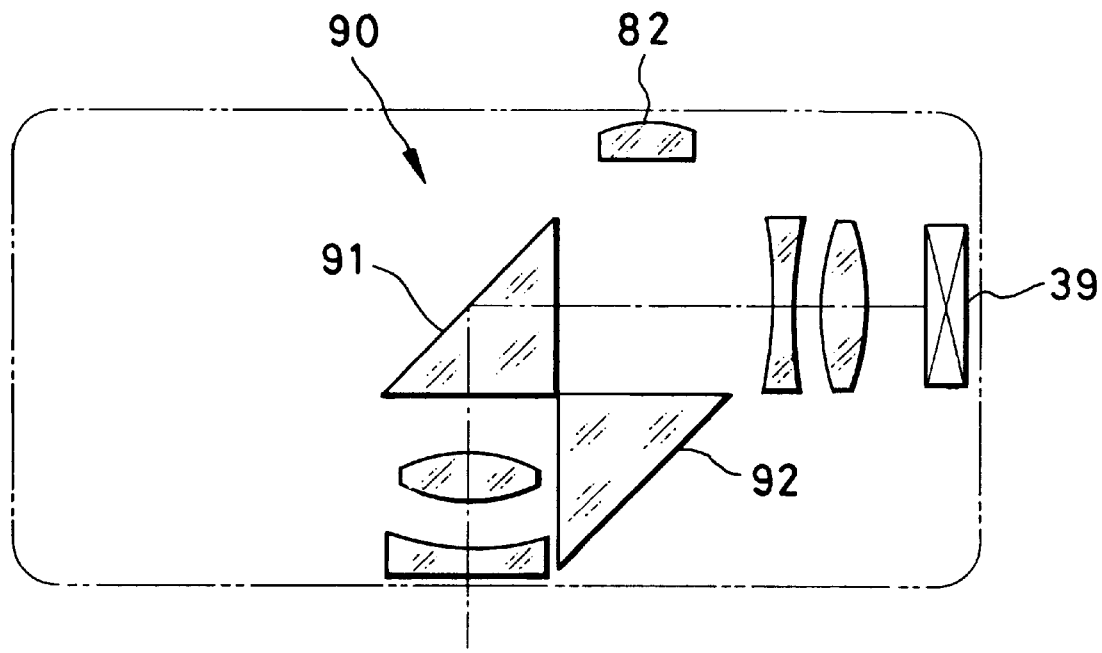
FIGS. 12A and 12B are explanatory views illustrating another embodiment of a view finder lens system of the still camera of FIG. 9.
Figure 12B:
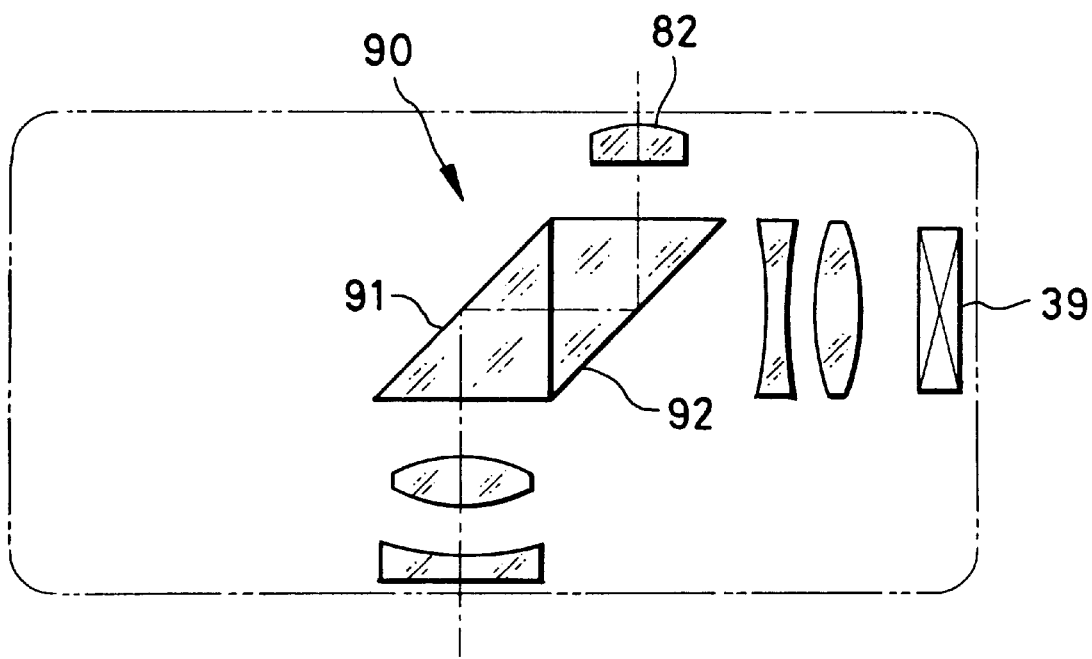

In the embodiment shown in FIG. 10, the photographic field can be viewed through the eyepiece 82 at any time. According to another embodiment shown in FIGS. 12A and 12B, a viewfinder optical system 90 is changeable between an LCD monitor system and an optical viewfinder system. The viewfinder optical system 90 is constituted of a pair of prisms 91 and 92, one of which is stationary, and the other is movable into and out of a viewfinder optical axis. When the movable prism 92 is out of the optical axis, as shown in FIG. 12A, an image of the subject is formed on an image sensor 39 through the stationary prism 91, so that the subject image is displayed on an LCD monitor. When the prism 92 is inserted in the viewfinder optical axis, as shown in FIG. 12B, an image of the subject is directed to an eyepiece 82, so that the photographer can view the subject image through the eyepiece 82.

The prism 92 may be moved automatically when the power source voltage goes below a predetermined level, or may be moved manually at any time. It is possible to provide optical systems separately for the optical viewfinder and for the image sensor. It is of course possible to switch over the still camera 80 between a film-photo mode where the still camera 80 functions merely as a film-photo camera and a digital imaging mode where the still camera 80 functions merely as a digital camera, in corporation with the switching between the optical viewfinder and the LCD viewfinder.

The embodiments shown in FIGS. 9 to 12B are applicable not only to the still camera 80 having both the film-photo function and the digital imaging function, but also to any type camera with an LCD viewfinder.

Thus, the present invention is not to be limited to the above embodiments but, on the contrary, various modifications are possible to those skilled in the art without departing from the scope of claims attached hereto.

What is claimed is:

1. A still camera comprising:
    reading means for reading an ID code from a photo filmstrip or a container of the photo filmstrip loaded in the camera;
    an imaging device for photoelectrically picking up an analog image signal from a subject;
    image processing means for converting the analog image signal into digital image data;
    a display device for displaying a movie image of the subject based on the digital image data;
    photography means for photographing an image frame of the subject on the photo filmstrip in response to one shutter release operation;
    frame number determining means for determining a serial frame number of the image frame photographed on the filmstrip;
    data writing means for writing the digital image data of one frame in a memory synchronously with each shutter release operation, wherein the data writing means writes additional data relating to the photographed frame in the memory in association with the image data of a corresponding frame, the additional data including the ID code of the filmstrip and the frame number of the photographed image frame, and
    manual data input means for entering optional data to be assigned to a designated image frame prior to or after photography of the designated image frame while displaying the optional data on the display device, wherein the optional data may be displayed in combination with the movie image of the subject prior to the photography, or may be displayed in combination with a still image of the designated image frame after the photography in the reproduction mode, and the optional data is written in the memory after the photography in association with the image data of the designated image frame.

2. A still camera according to claim 1, wherein the memory has a capacity enough to store the image data and the additional data for at least one filmstrip that can photograph a plurality of image frames thereon.

3. A still camera according to claim 2, wherein the memory is a built-in memory of the still camera, a card-type memory attachable to the still camera, or a memory incorporated into the container of the filmstrip.

4. A still camera according to claim 3, wherein the still camera can operate in a reproduction mode wherein the display device displays a still image of the image frame photographed on the filmstrip, accompanied with the frame number of the photographed image frame, based on the data written in the memory.

5. A still camera according to claim 4, further comprising a connector through which the still camera may be connected to a peripheral apparatus to transfer the data written in the memory to a second memory of the peripheral apparatus, for displaying a still image of at least one of the image frames photographed on the filmstrip accompanied with the ID code and the frame number on an external monitor, or for making a hard copy of at least one of the photographed image frames.

6. A still camera according to claim 4, wherein the optional data written in the memory may be revised by operating the manual data input means while observing the optional data on the display device in the reproduction mode.

7. A still camera according to claim 1, further comprising an optical viewfinder consisting of an optical system having at least an eyepiece and an objective lens.

8. A still camera according to claim 7, wherein the optical viewfinder is alternatively used with the display device displaying the movie image of the subject.

9. A still camera according to claim 7, further comprising checking means which compares a supply voltage from a power source of the still camera with a reference voltage and stops power supply to the imaging device and the display device when the supply voltage goes below the reference voltage.

10. A still camera comprising:

reading means for reading an ID code from a photo filmstrip or a container of the photo filmstrip loaded in the camera;

an imaging device for photoelectrically picking up an analog image signal from a subject;

image processing means for converting the analog image signal into digital image data;

a display device for displaying a movie image of the subject based on the digital image data;

photography means for photographing an image frame of the subject on the photo filmstrip in response to one shutter release operation;

frame number determining means for determining a serial frame number of the image frame photographed on the filmstrip;

a magnetic recording device for writing data on a magnetic recording layer that is provided on the filmstrip in association with each image frame photographed on the filmstrip;

a memory for storing the image data and additional data relating to the photographed frame, including the ID code of the filmstrip and the frame number of the photographed image frame;

data writing means for writing the digital image data of one frame in the memory synchronously with each shutter release operation, and for writing the additional data, and at least part of the data written on the magnetic recording layer in the memory in association with the image data of the corresponding frame and manual data input means for entering optional data to be assigned to a designated image frame prior to or after the photography of the designated image frame, wherein the optional data is written by the magnetic recording device on the magnetic recording layer in association with the designated image frame, and is written in the memory by the data writing means in association with the image data of the designated image frame.

11. A still camera according to claim 10, wherein the memory has a capacity enough to store the image data and the additional data for at least one filmstrip that can photograph a plurality of image frames thereon.

12. A still camera according to claim 11, wherein the memory is a built-in memory of the still camera, a card-type memory attachable to the still camera, or an IC memory incorporated into the container of the filmstrip.

13. A still camera according to claim 12, wherein the optional data may be displayed on the display device in combination with the movie image of the subject prior to the photography, or in combination with a still image of the designated image frame after the photography based on the data written in the memory, and may be revised by operating the manual data input means while observing the optional data on the display device, wherein the revised optional data is rewritten on the magnetic recording layer and in the memory.

14. A still camera according to claim 13, wherein the data written by the magnetic recording device further include photo data representative of an exposure value and the date of photography of each image frame.

15. A still camera according to claim 13, wherein the container permits advancing the photo filmstrip out of the container by rotating a spool in an unwinding direction after having the filmstrip fully wound into the container, and the still camera further comprises film transport means which rotates the spool of the container in the unwinding direction.

16. A still camera according to claim 15, wherein when the container contains a developed photo filmstrip, and the ID code read by the reading means coincides with the ID code stored in the memory, the display device displays based on the data written in the memory a still image of at least one of image frames on the developed photo filmstrip, accompanied with the frame number and the optional data, so that the optional data may be revised by operating the manual data input means while observing the optional data on the display device, the revised optional data being rewritten on the magnetic recording layer and in the memory.

17. A still camera comprising:

an imaging device for photoelectrically picking up an analog image signal from a subject;

a display device for displaying a movie image of the subject based on the image signal picked up by the imaging device;

photography means for photographing an image frame of the subject on a photo filmstrip in response to one shutter release operation;

an optical viewfinder consisting of an optical system having at least an eyepiece and an objective lens, and checking means for comparing a supply voltage from a power source of the still camera with a reference voltage and for stopping a power supply to the imaging device and the display device when the supply voltage falls below the reference voltage while the photography means and the optical system are still capable of photographing the image frame of the subject when the power supply stops for the imaging device and the display device.

18. A still camera according to claim 17, wherein the optical system of the optical viewfinder is partly used as optical system for forming an image of the subject on the imaging device.

* * * * *